United States Patent [19]
Kline et al.

[11] Patent Number: 5,768,896
[45] Date of Patent: Jun. 23, 1998

[54] AIR CYCLE REFRIGERATION AND AIR TEMPERATURE QUENCHING SYSTEM AND METHOD

[75] Inventors: Erin G. Kline, Vernon; Mark L. Harris, Enfield; George E. Wilmot, Jr., East Granby; Douglas Christians, Vernon, all of Conn.

[73] Assignee: United Technologies Corporation, Windsor Locks, Conn.

[21] Appl. No.: 771,188

[22] Filed: Dec. 20, 1996

[51] Int. Cl.$^6$ .................................... F25B 9/00
[52] U.S. Cl. .................................... 62/87; 62/402
[58] Field of Search .................. 62/87, 88, 402

[56] References Cited

U.S. PATENT DOCUMENTS

| | | | |
|---|---|---|---|
| 3,878,692 | 4/1975 | Steves ........................................ | 62/87 |
| 4,265,397 | 5/1981 | Rannenberg ............................... | 62/402 |
| 4,476,693 | 10/1984 | Johnson .................................... | 62/402 |
| 4,829,775 | 5/1989 | Defrancesco ............................... | 62/90 |
| 5,180,278 | 1/1993 | Warner ...................................... | 415/27 |
| 5,214,935 | 6/1993 | Brunskill .................................... | 62/402 |
| 5,309,724 | 5/1994 | Schreiber et al. .......................... | 62/87 |
| 5,323,624 | 6/1994 | Schwalm .................................... | 62/401 |
| 5,461,882 | 10/1995 | Zywiak ..................................... | 62/402 |

*Primary Examiner*—Ronald C. Capossela

[57] ABSTRACT

An air cycle air conditioning system comprises a first air source for supplying cooling air and a second air source for supplying high temperature system air. The system further includes a device for transferring heat from the high temperature air and producing conditioned air having a temperature substantially lower than the high temperature system air. A mechanism for directing the conditioned air to the high temperature air prior to the high temperature air entering a component of the system for decreasing the temperature of the high temperature system air, prior to it contacting the system component is also provided. An air cycle air conditioning method comprises the steps of supplying cooling air and high temperature system air to a system component; transferring heat from the high temperature system air and producing conditioned air having a temperature substantially lower than the higher temperature system air; and mixing at least a portion of the conditioned air and the system air prior to its contact with the system component for decreasing the temperature of the high temperature air prior to reaching the system component.

25 Claims, 1 Drawing Sheet

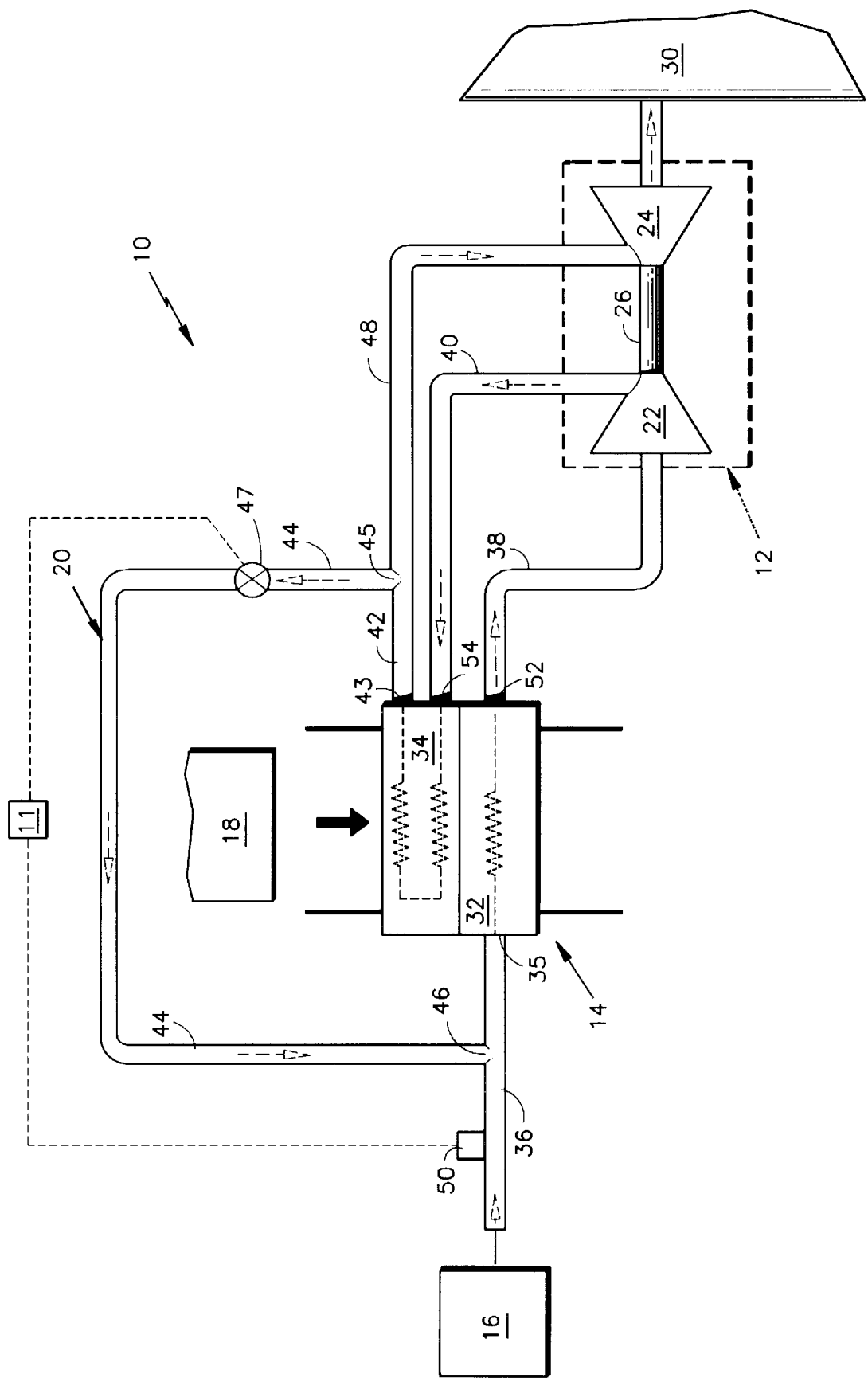

AIR CYCLE REFRIGERATION AND AIR TEMPERATURE QUENCHING SYSTEM AND METHOD

TECHNICAL FIELD

This invention is directed to an air cycle, air conditioning system and method, and more particularly, to an air cycle refrigeration, temperature quenching system and method using a cooled air feedback. The feedback loop extends preferably from a cool air output of a system component, such as that of a secondary heat exchanger, back to the input of another system component, such as a primary heat exchanger, for reducing the temperature of the air initially input to the component, thus allowing the use of desirable light weight materials for forming the system components.

BACKGROUND ART

Air cycle environmental control systems (ECS) are used to regulate the conditions of an enclosed environment such as an aircraft cabin. An air cycle ECS generally includes a compressor for pressurizing air input thereto and a turbine for driving the compressor and for expanding and cooling the air. An ECS is typically powered by air input thereto from a compressor section of an engine or from an auxiliary power unit. In a closed system such as an aircraft, tank or other occupied vehicle, system efficiency, weight and simplicity become paramount design considerations.

In accordance with these considerations, it is important to use components designed to minimize weight. Accordingly, these components should have an efficient structural design and be formed from the lightest weight materials possible, taking into consideration the environment within which the component is used and structural demands on the component. Improved vehicle performance is achieved with improved component design.

Certain components, such as heat exchangers, used in air cycle environmental control systems, contribute significant size and weight of the overall system. It is preferable therefore, to efficiently design such components such that their size and weight are minimized yet their performance is maximized.

For example, in many current environmental control systems which use heat exchangers, the heat exchangers are formed from steel that is typically heavier than desired while exceeding strength requirements. Titanium is also used as a material for constructing heat exchangers, and while it is typically strong enough and of acceptable weight, it is generally not preferred due to its expense. Aluminum and composites are probably the most preferable form of material for use in forming heat exchangers due to its light weight and high strength. However, since most current environmental control systems initiate air conditioning with air exceeding 600° F., typically bleeding such air from an engine compressor, aluminum or composites are difficult to use as the primary heat exchanger material without a preliminary cooling step, since such temperatures can cause significant damage to aluminum or composite structures. The same problems exist with other ACM components such as valves and piping materials.

Accordingly, existing environmental control systems using heat exchangers can be too heavy or prohibitively expensive if steel or titanium is used, and too complex and expensive if aluminum is used, probably requiring additional equipment for achieving preliminary cooling.

There exists a need, therefore, for an air cycle environmental control system that safely allows for the use of aluminum or other lower weight, more desirable materials for forming components thereof, such as a primary heat exchanger, by functioning to decrease the temperature of initially input high temperature air to a level within a safe operating temperature range of the more desirable materials, without adding more components.

DISCLOSURE OF THE INVENTION

The primary object of this invention is to provide an air cycle environmental control system which controls air temperatures so as to allow for use of lightweight materials such as aluminum or composites as the material for forming components thereof, such as the primary heat exchanger.

Another object of this invention is to provide an air cycle environmental control system which includes a cool air feedback loop from the output of a system component, such as that of a heat exchanger, to initially provided high temperature system air, prior to its input into another system component, such as the primary heat exchanger thereof, for lowering the temperature of the initially provided air and allowing the use of a more desirous, lower weight material.

Still another object of this invention is to provide an air cycle environmental control system which includes a primary and secondary heat exchanger, wherein at least the primary exchanger is formed from aluminum and wherein high temperature air input into the primary heat exchanger is reduced in temperature by mixing it with air output from the secondary heat exchanger.

Yet another object of this invention is to provide an environmental control method that simply, economically, effectively and safely allows the use of aluminum as the material for forming components used therein.

And still another object of this invention is to provide an environmental control method using an air feedback step for feeding back cool air from a system component, such as a secondary heat exchanger, to high temperature high pressure initially input system air, provided for input to another system component, such as a primary heat exchanger, prior to its input, so as to reduce its potentially damaging temperature.

The objects and advantages of the present invention are achieved by the air cycle air refrigeration and air temperature quenching system of the present invention, which comprises a first air source for supplying cooling air and a second air source for supplying high temperature air. The system further includes means for transferring heat from the high temperature system air and producing conditioned air having a temperature substantially lower than the high temperature system air. Means for directing the conditioned air to the high temperature system air prior to the high temperature system air entering a component of the system, for decreasing the temperature of the high temperature air before reaching the component, is also provided.

For further achieving the objects and advantages set forth herein, an air cycle refrigeration and temperature quenching method of the present invention is provided which comprises the steps of supplying cooling air and high temperature system air to a system component; transferring heat from the high temperature system air and producing conditioned air having a temperature substantially lower than the higher temperature system air; and mixing at least a portion of the conditioned air and the system air for decreasing the temperature of the high temperature system air prior to reaching and contacting the system component, thus allowing the use of desirable lightweight materials.

BRIEF DESCRIPTION OF THE DRAWINGS

The FIGURE represents a simplified schematic view of an air cycle refrigeration and temperature quenching system in accordance with the principles of the present invention, including an air cycle machine, a heat exchanging system, a high temperature, high pressure air source, a ram air source, and a quenching air feedback loop.

Best Mode for Carrying Out the Invention

Referring now to the drawing in detail, there is shown in the FIGURE a simplified schematic view of air cycle refrigeration and temperature quenching system of the present invention, which is designated generally as 10. System 10 generally includes an air cycle machine 12, heat exchanger system 14, a high pressure, high temperature air source 16, a cooling or ram air source 18, and a quenching air feedback loop 20.

Air cycle machine 12, shown simplified and schematically in the FIGURE, preferably includes a compressor 22 and a turbine 24 connected to the compressor by a shaft 26. Compressor 22 functions to pressurize the air input therein for subsequent use downstream. The turbine extracts heat energy from the air input therein so as to drive compressor 22 and typically a fan (not shown), used when necessary to draw air into the system. The turbine, therefore, functions to expand the compressed air and cool the same for later use in air conditioning enclosed areas, such as a passenger occupied cabin of a vehicle such as an aircraft. Accordingly, the expanded, cooled air is directed from turbine 24 to cabin 30 and in accordance with known methods and systems, is preferably conditioned en route. For a more detailed description of a typical air cycle machine 12, reference is made, for example, to U.S. Pat. No. 5,086,622, assigned to the assignee of the present invention.

The inlet air for compressor 22 is drawn from heat exchanging system 14. Heat exchanging system 14 preferably includes a primary heat exchanger 32 and a secondary heat exchanger 34. High temperature, high pressure air is directed into primary heat exchanger 32 at input 35, from the high temperature, high pressure air source 16, by known methods. Ram air is forced into and across the secondary and primary heat exchangers, and at ground level is drawn in via the fan (not shown), also by known methods, so as to facilitate the transfer of heat from the higher temperature air flowing through the heat exchangers.

The following description is directed toward using the principles of the present invention to allow the formation of the heat exchangers, specifically the primary heat exchanger 32, from any desired material, such as aluminum or composites or carbon-carbon, so as to reduce weight and increase efficiency, by controlling input temperature. However, it should be understood that this invention is not limited to such applicability in that the feedback loop arrangement can be used to reduce inlet air temperature to many system components, such as a valve, so as to allow the use of aluminum or other desirable materials such as carbon-carbon or composites as the component-forming material. Accordingly, element 32, while described as a heat exchanger for example below, can be any other system component, such as a valve, pipe, compressor, etc.

In accordance with the principles of the present invention, primary heat exchanger 32 and secondary heat exchanger 34 are preferably formed from lightweight, high strength material, such as and in the most prefered embodiment aluminum, but also carbon-carbon or composites can be used, so as to minimize the weight of system 10. That is, the invention is not limited in application to aluminum, in that any other appropriate lightweight, high strength materials may be used, such as carbon-carbon and composites, by using the principles of the present invention to control system component input temperature. Accordingly, in using such lightweight materials, such as aluminum, the temperature of the high pressure, high temperature air from air source 16 is preferably controlled so as not to inflict structural damage upon the primary heat exchanger. Such control is accomplished with particularly feedback loop 20.

The high temperature, high pressure air from the high pressure source 16, such as from the compressor portion of an aircraft engine, an APU, and a ground cart, is directed to the primary heat exchanger via high temperature line 36 for the initial transfer of heat therefrom. System air in the form of initially conditioned air exits primary heat exchanger 32 at line 38 at a temperature lower than that at the input side of the primary heat exchanger. The initially conditioned air is directed through line 38 into compressor 22 and is acted on as described in detail above. System air in the form of further conditioned air exits compressor 22 and is directed through line 40 to secondary heat exchanger 34. The further conditioned air is again at high temperature and high pressure. The further conditioned air is cooled in secondary heat exchanger 34 via transfer of heat therefrom to the ram air flowing across the secondary heat exchanger. Accordingly, system air now in the form of conditioned air is caused to exit the secondary heat exchanger 34 to line 42. The conditioned air is at a relatively low temperature, high pressure state. This air is substantially lower in temperature and higher in pressure than the system air initially input to the system.

A feedback line 44 extends from a juncture 45 with line 42, downstream of outlet 43 preferably of secondary heat exchanger 34, back to line 36, specifically to a juncture 46, for directing at least a portion of the conditioned air to line 36, upstream of input 35 of primary heat exchanger 32. Between juncture 45 and juncture 46 on feedback line 44, a quench-valve 47 is provided for controlling air flow from line 42 through feedback line 44, to line 36. Line 48 also extends from juncture 45 for directing air from secondary exchanger 34 to turbine 24.

Feedback can be originated from other cool air sources, such as a reheater, and accordingly, it should be understood that the scope of this invention includes origination from any such cool air sources. Similarly, and as stated above, feedback can be directed upstream of various system components, such as valves, and accordingly, it should be understood that the scope of this invention includes feedback upstream of any such system components.

In accordance with the principles of the present invention, line 36 includes a temperature sensor 50 or temperature switch which operates to sense the temperature of the system air originating from the high pressure, high temperature air source 16. Sensor 50 is preferably located on line 36 upstream of juncture 46. Accordingly, when the temperature of the air originating source 16 is sensed to exceed a critical, threshold value, defined by a specific temperature or temperature range whereat safe operation of the light weight material, most preferably aluminum, but also including carbon-carbon and composites, primary heat exchanger, or other component, can occur, quench-valve 47 is directed through software or other means of communication, e.g. controller 11, to open and invoke the flow of air from line 42, through feedback line 44, and into line 36. Upon such a communication, therefore, at least a portion of the cooler, conditioned air, which is output from secondary heat exchanger 34 flows from line 42 through line 44. This air is mixed with the high temperature, high pressure air from source 16, in the vicinity of juncture 46 in line 36, prior to its input into primary heat exchanger 32. The flow of the conditioned air through line 44 from line 42 is due to the high pressure of this conditioned air obtained from compression in compressor 22 and the pressure differential thereby existent between lines 42 and 44. Due to the temperature differential between the conditioned air and the high temperature, high pressure source air, the high temperature air from source 16 is caused to decrease in temperature. This decrease is preferably substantially below the threshold or critical temperature value, which value is determined by the material used for forming the component for which the temperature is being reduced.

In instances where sensor 50 determines that the air temperature of the air from the high pressure, high temperature source 16 is below the critical or threshold value, the quench valve is not activated, no mixture at junction 46 occurs, and the air from source 16 is directed unmixed through line 36 to primary heat exchanger 32. Such instances may occur when source 16 is other than an engine compressor, such as a temperature controlled air source, or when the air bled off the engine has a temperature less than the critical or threshold value.

In the FIGURE, heat exchangers 32 and 34 are illustrated as arranged in series relative to the flow direction of the ram air. It will be appreciated that heat exchangers 32 and 34 could be arranged in parallel with respect to the ram air, or other cooling medium, to provide fully satisfactory inlet air cooling while still functioning with the feedback loop as described in detail above. It will be appreciated that the shut-off feature provided by valve 47 can be eliminated and the temperature reduction achieved under all operation.

Initially conditioned, lower temperature, lower pressure air is directed through line 38, from outlet 52 of primary heat exchanger 32, and into compressor 22, where the initially conditioned air is compressed and the temperature thereof is raised to produce further conditioned air. The further conditioned air is directed through line 40 to the secondary heat exchanger 34, through inlet 54 thereof, wherein the further conditioned air undergoes heat exchange with ram air from source 18, flowing across secondary heat exchanger 34, thereby producing conditioned air. This air is expelled into line 42. The conditioned air from line 42 is directed into line 48 which is further directed into turbine 24. In turbine 24 the air is expanded and cooled and used to drive shaft 26 and accordingly, compressor 22 and the fan (not shown).

This airflow sequence will continue until sensor 50 senses that air from the high pressure, high temperature source 16 has reached or exceeded the critical or threshold temperature, which temperature could cause damage to the aluminum, or other preferred material, heat exchanger 32, or other component of system 10. Upon sensing the temperature at the critical stage, sensor 50 communicates with the quench valve 47. The sensor directs valve 47 to open and allows flow of conditioned air from line 42 through line 44 to juncture 46 and line 36.

At juncture 46, the conditioned air, which is at a substantially relatively lower temperature with respect to the air from source 16, is mixed with the high temperature air from source 16. This reduces the temperature of the high temperature air to below the critical or threshold value. This feedback sequence continues as needed so as to maintain the air from source 16 at a temperature below the critical or threshold value so as to protect the integrity of primary heat exchanger 32.

In accordance with the system and method as described above, substantial weight and economic benefits are obtained since a light weight material may be used, such as aluminum, as opposed to steel or other heavier and/or more expensive material, for forming the heat exchangers.

The primary advantage of this invention is that an air cycle environmental control system is provided which controls input air temperatures so as to allow for use of light weight material, such as aluminum, as the material for forming components thereof, such as the primary heat exchanger. Another advantage of this invention is that an air cycle environmental control system is provided which includes a feedback loop from the cool air output of a system component, such as a heat exchanger, to initially provided high temperature bleed air, prior to its input into a component, such as the primary heat exchanger thereof, for lowering the temperature of the initially provided air and allowing the use of a more desirous, lower weight material. Still another advantage of this invention is that an air cycle environmental control system is provided which includes a primary and secondary heat exchanger, wherein at least the primary exchanger is formed from aluminum and wherein high temperature air input into the primary heat exchanger is reduced in temperature by mixing it with air output from the secondary heat exchanger. Yet another advantage of this invention is that an environmental control method is provided that simply, economically, effectively and safely allows the use of aluminum as the material for forming components used therein. And still another advantage of this invention is that an environmental control method is provided using an air feedback step for feeding back cool air from a system component, such as the secondary heat exchanger to high temperature high pressure initial air, provided for input into another system component, such as a primary heat exchanger, prior to its input, so as to reduce its potentially damaging temperature, and allowing the use of desirable light weight materials.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. An air cycle air conditioning system, comprising:
   a first air source for supplying cooling air;
   a second air source for supplying system air to a system component of said system, wherein said system air has a higher temperature than said cooling air;
   first means for transferring heat from said system air to said cooling air and producing conditioned air having a temperature lower than said system air; and
   means for directing at least a portion of said conditioned air to said system air prior to said system air contacting said system component for decreasing the temperature of said system air prior to reaching said system component.

2. The system according to claim 1, further comprising means for sensing the temperature of said system air and means for invoking said means for directing when said temperature exceeds a threshold value.

3. The system according to claim 2, wherein said means for invoking comprises a valve responsive to said means for invoking, wherein when said means for sensing senses that said temperature has exceeded said threshold value, said valve is opened for allowing flow of said conditioned air through said means for directing.

4. The system according to claim 1, wherein said system component is comprised of means for initially transferring heat from said system air to said cooling air prior to said first means for transferring, to produce initially conditioned air having a less higher temperature than said system air.

5. The system according to claim 4, further comprising a compressor means for compressing said initially conditioned air and producing further conditioned air adapted to be directed to said first means for transferring heat.

6. The system according to claim 5, further comprising a turbine means for expanding said conditioned air, driving said compressor means, and producing output conditioned air.

7. The system according to claim 4, wherein a temperature differential exists between said conditioned air and said system air such that said system air is reduced to a temperature below a threshold temperature value upon mixing with said conditioned air.

8. The system according to claim 7, wherein said means for initially transferring is safely operable below said critical threshold temperature value.

9. The system according to claim 8, wherein said means for transferring includes an outlet, further comprising a high temperature fluid communication line extending from said second air source and connected with an inlet of said initial means for transferring, wherein said means for directing comprises a fluid feedback line connected downstream of said outlet of said means for transferring and extending to and connected with said high temperature fluid communication line at a position upstream of said inlet.

10. The system according to claim 4, wherein:
said means for initially transferring comprises a primary heat exchanging means connected at an inlet with said second air source for receiving said system air at said higher temperature, wherein said cooling air is directed across said primary heat exchanging means for producing said initially conditioned air;
said means for transferring comprising a secondary heat exchanging means in fluid communication with said primary heat exchanging means for receiving said initially conditioned air, wherein said cooling air is directed across said secondary heat exchanging means for producing said conditioned air; and
said means for directing further for directing said conditioned air from said secondary heat exchanging means to a position upstream of said inlet of said primary heat exchanging means.

11. The system according to 10, wherein said means for directing comprises a fluid feedback line extending from a position downstream of an outlet of said secondary heat exchanger to said position upstream of said inlet.

12. The system according to claim 11, further comprising a high temperature air line for directing said system air from said secondary air source to said primary heat exchanger.

13. The system according to claim 10, wherein said primary heat exchanging means further comprises a primary outlet and said secondary heat exchanging means includes a secondary inlet, and wherein said primary outlet is connected in fluid communication with said secondary inlet.

14. The system according to claim 10, wherein said primary heat exchanging means comprises a primary heat exchanger formed from aluminum.

15. The system according to claim 1, wherein a temperature differential exists between said conditioned air and said system air such that said system air is reduced to a temperature below a critical temperature value upon mixing with said conditioned air.

16. The system according to claim 1, wherein said system component is safely operable below said critical threshold temperature value.

17. The system according to claim 16, further comprising a high temperature fluid communication line extending from said second air source and to an inlet of said system component, wherein said means for directing comprises a fluid feedback line connected to an outlet of said means for transferring and extending to and connected with said high temperature fluid communication line at a position upstream of said inlet.

18. An air cycle air conditioning method, comprising the steps of:
supplying cooling air;
further supplying system air having a higher temperature than said cooling air to a system component
transferring heat from said system air to said cooling air and producing conditioned air having a temperature lower than said system air; and
mixing at least a portion of said conditioned air and system air prior to contact with said system component for decreasing the temperature of said system air prior to reaching said system component.

19. The method according to claim 18, further comprising the steps of sensing the temperature of said high temperature air and invoking said step of mixing when said temperature meets a threshold value.

20. The method according to claim 19, wherein said step of invoking comprises the step of opening a valve.

21. The method according to claim 18, wherein said step of mixing includes the step of feeding back said conditioned air to said system air for reducing the temperature of said system air to below a critical temperature prior to contact with said system component.

22. The method according to claim 18, further comprising the step of initially transferring heat from said system air and producing initially conditioned air.

23. The method according to claim 22, further comprising the steps of:
compressing said initially conditioned air and producing further conditioned air; and
directing said further conditioned air to a means for transferring heat from said conditioned air to said cooling air to produce conditioned air.

24. The method according to claim 22, wherein:
said step of initially transferring comprises the step of directing said system air having a high temperature through a primary heat exchanger wherein said system component comprises said primary heat exchanger and directing said cooling air across said primary heat exchanger for allowing transfer of heat from said system air to said cooling air and producing said initially conditioned air;
said step of transferring comprises the step of directing said initially conditioned air through a secondary heat exchanger and directing said cooling air across said secondary heat exchanger for allowing transfer of heat from said initially conditioned air to said cooling air and producing said conditioned air having a temperature lower than said high temperature system air; and
said step of mixing comprises the step of providing said conditioned air for mixture with said system air at a position upstream of said primary heat exchanger and prior to said high temperature system air entering said primary heat exchanger.

25. The method according to claim 24, wherein said primary heat exchanger is formed from aluminum.

* * * * *